United States Patent [19]

Pomara, Jr.

[11] 4,015,517

[45] Apr. 5, 1977

[54] FOOD PROCESSING DEVICE

[75] Inventor: Johnny B. Pomara, Jr., Dallas, Tex.

[73] Assignee: El Chico Corporation, Dallas, Tex.

[22] Filed: Sept. 10, 1975

[21] Appl. No.: 612,171

[52] U.S. Cl. .............................. 99/355; 99/443 C
[51] Int. Cl.² ....................................... A47J 27/14
[58] Field of Search ............ 99/339, 340, 352–353, 99/355, 386, 390–391, 403–404, 407, 422–423, 441, 443 C, 446, 447

[56] References Cited

UNITED STATES PATENTS

| 2,244,670 | 6/1941 | Benedict | 99/339 |
|---|---|---|---|
| 3,019,744 | 2/1962 | Carvel | 99/443 C X |
| 3,090,294 | 5/1963 | Rodman | 99/339 X |
| 3,316,833 | 5/1967 | Williams et al. | 99/443 C X |
| 3,455,231 | 7/1969 | Larmuseau | 99/339 |
| 3,491,679 | 1/1970 | Kelly | 99/443 C X |
| 3,520,249 | 7/1970 | Miller, Jr. | 99/443 C X |
| 3,581,652 | 6/1971 | Chauvin | 99/443 C X |
| 3,608,474 | 9/1971 | Liepa | 99/404 X |
| 3,610,134 | 10/1971 | Morley | 99/443 C X |
| 3,739,712 | 6/1973 | Duning | 99/443 C X |

Primary Examiner—Stanley N. Gilreath
Assistant Examiner—Arthur O. Henderson
Attorney, Agent, or Firm—H. Mathews Garland

[57] ABSTRACT

A food processing device comprising a heating and storage unit for both soft tortillas and toasted tortilla chips. The unit includes a power driven conveyor belt system for continuous movement of soft tortillas through a heated zone and a storage and dispensing chamber above the conveyor belt system for toasted tortilla chips. In one form of the invention, the conveyor belt system comprises upper and lower horizontal belts having an upper portion of the lower belt which runs essentially in contact with a lower portion of the upper belt through the heated zone for lightly pressing and moving soft tortillas continuously through the heated zone. Both forms of the unit include structure for directing the heated gases employed with the soft tortillas into the storage and dispensing portion of the unit for heating and keeping warm the toasted tortilla chips.

7 Claims, 11 Drawing Figures

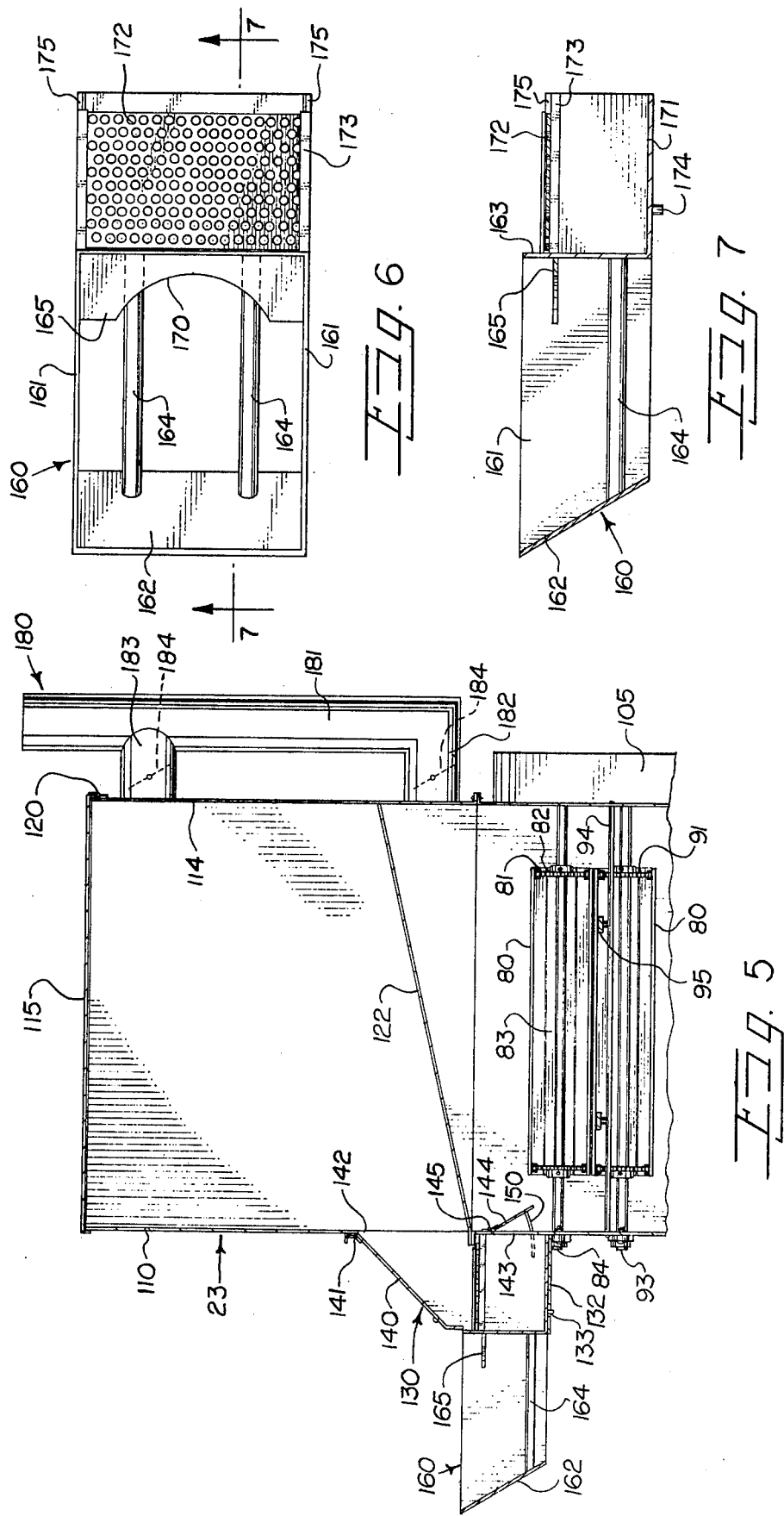

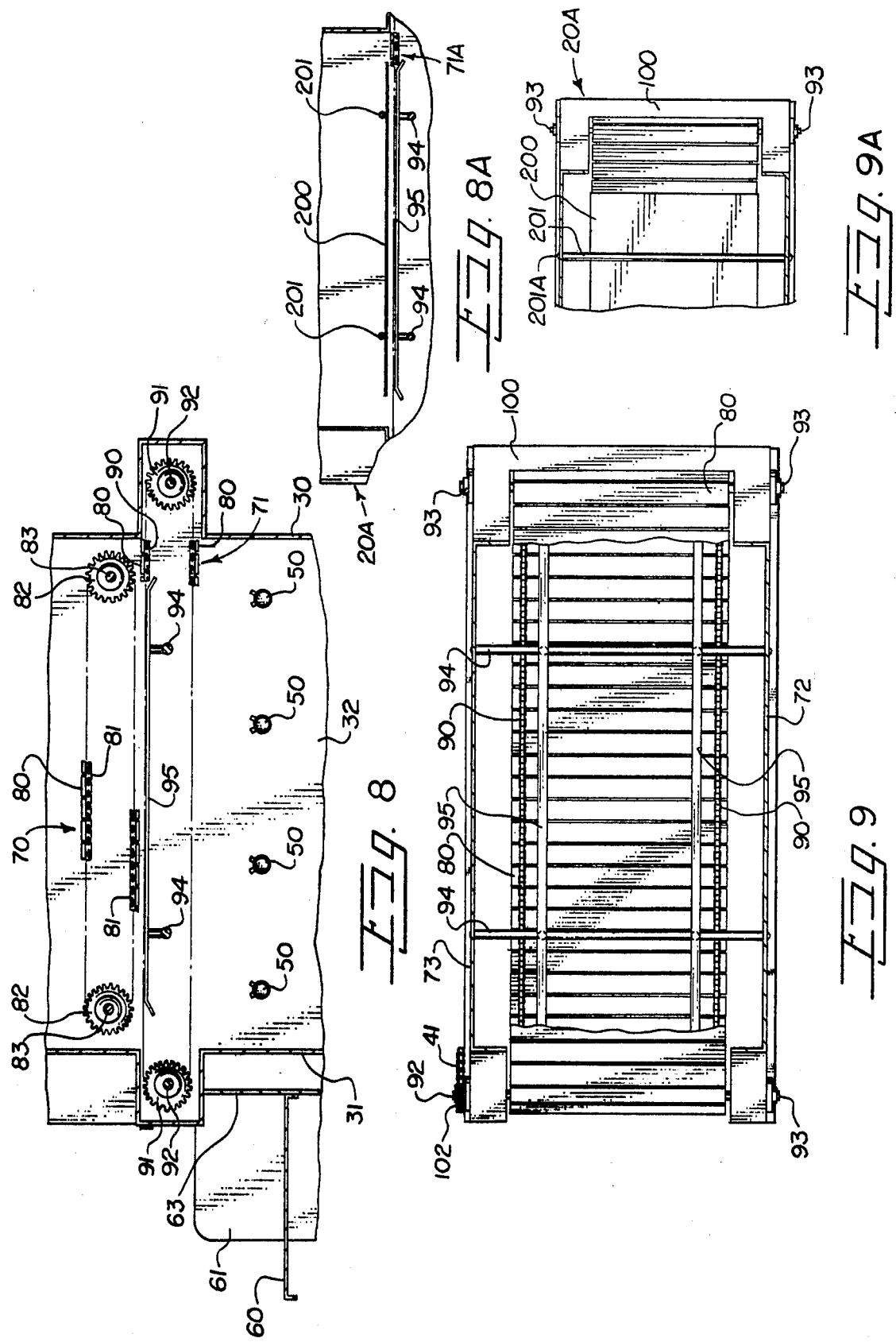

FOOD PROCESSING DEVICE

This invention relates to food processing devices and more particularly relates to a unit for heating both soft tortillas and toasted tortilla chips.

Tortillas are thin round food products of unleavened corn meal bread of Mexican origin and resembling pancakes. They are served both in a soft form and in a hard toasted generally broken chip form. The soft tortilla preferably is heated before serving and is often eaten by spreading it with butter and rolling it into a tube form. The toasted broken tortilla chips also are preferably heated before serving and may be eaten in a number of different ways. Various approaches have been taken to the process of heating both the soft and the toasted tortillas. Generally the soft tortillas have been heated on grills similar to the cooking of pancakes. This requires individual constant attention in handling the tortillas and insuring against burning particularly if a very hot grill is used. The heating of the toasted tortilla chips has been done in a number of ways including the use of ovens. Efficient substantially continuously operating units for processing both the soft and the toasted tortillas has not been known to be available.

It is therefore a principal object of the invention to provide a new and improved food processing unit.

It is another object of the invention to provide a new and improved unit for heating soft tortillas.

It is another object of the invention to provide a new and improved unit for heating toasted tortilla chips.

It is still another object of the invention to provide a unit for heating both soft tortillas and toasted tortilla chips from a common heat source.

It is another object of the invention to provide a unit for heating soft tortillas which may be fed continuously to provide uniform controllable heating of the tortillas.

It is another object of the invention to provide a unit for heating soft tortillas which will maintain them in a flat condition while they are heating.

In accordance with the invention there is provided a device for heating both soft tortilla food products and toasted tortilla chips from a common heat source providing a continuous means of heating the soft tortillas and storage and dispensing facilities for the tortilla chips. The device has a lower heating and drive section, and intermediate or middle belt conveyor section for continuous heating of soft tortillas and an upper storage and dispensing section for the toasted tortilla chips. The conveyor section of one form of the invention includes upper and lower conveyor belts which have their portions running in substantial contact with each other through a heater zone for pressing and heating the soft tortillas. The soft tortillas are fed into one end of the device between the upper and lower conveyor belts, propelled through a heating portion of the device by the belts, and discharged at the opposite end of the device. Another form of the invention has a conveyor section which includes the lower belt only to transport the tortillas and a heat reflecting panel supported in close parallel spaced relation above the upper portion of the belt. The tortillas move through the device on the lower belt upper face beneath the reflecting panel. The toasted tortilla chips are loaded through a top door into the upper compartment of the device and dispensed through side opening chutes.

The foregoing objects and advantages of the invention will be better understood from the following detailed description taken in conjunction with the accompanying drawings wherein:

FIG. 5 is an enlarged fragmentary view in section and elevation of the device taken along a plane parallel to the end panels of the device through one of the dispensing chutes;

FIG. 6 is a top plan view of a removable tray which fits each of the dispensing chutes;

FIG. 7 is a view in section and elevation along the line 7—7 of FIG. 6;

FIG. 8 is a fragmentary side view in section and elevation taken in a plane perpendicular to the front and back faces of the device showing the stucture of the conveyor system; and FIG. 8A is a fragmentary side view in section similar to FIG. 8 showing a reflecting panel used in place of the upper belt and a modified form of belt structure;

FIG. 9 is a fragmentary top view in section and elevation taken along a horizontal line as seen in FIG. 8 between the upper and lower conveyor belts with a portion of the lower belt broken out to illustrate the structure of the belt and of the supporting frame holding the upper portion of the belt level.

FIG. 9A is a fragmentary view in section similar to FIG. 9 showing the panel and belt of the modified device of FIG. 8A.

Figure 1:
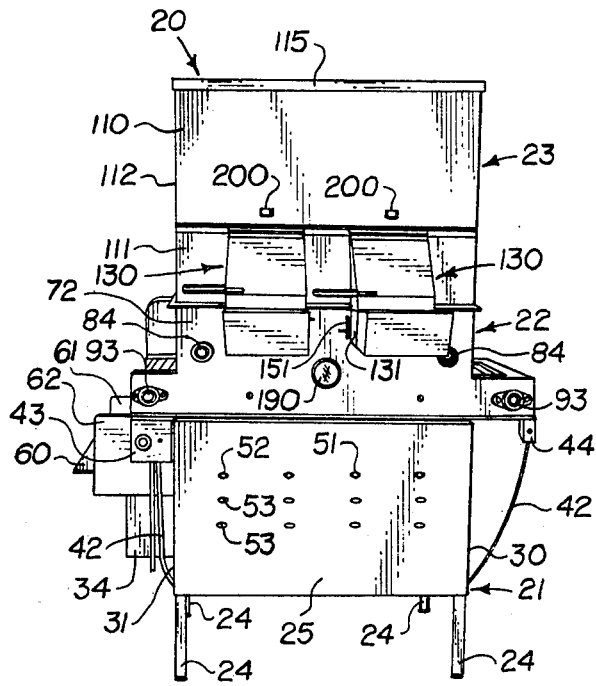
FIG. 1 is a side view in elevation of a food processing device embodying the features of the invention as seen from the front dispensing side of the device.
Figure 2:
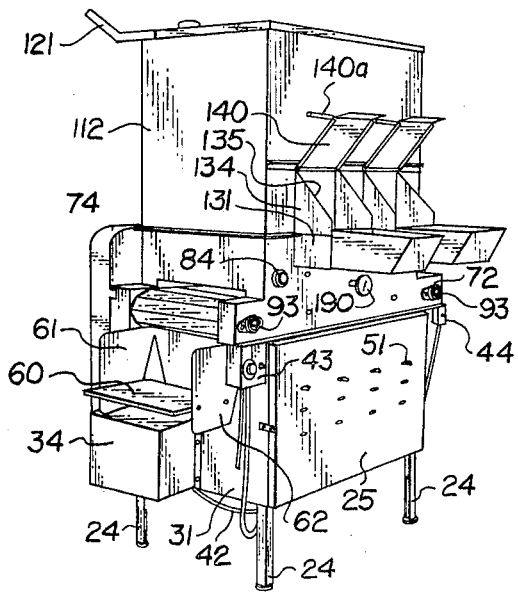
FIG. 2 is a side and end view in perspective of the device of FIG. 1 as seen from the discharge end of the conveyor system.
Figure 3:
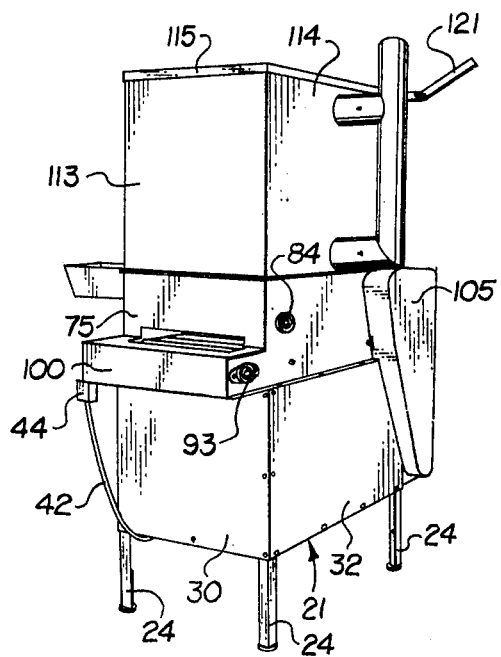
FIG. 3 is a perspective view of the device as seen from the back and end of the device at the input of the conveyor system.

Referring to the drawings, a food processing device 20 for heating soft tortillas and heating, storing and dispensing toasted tortilla chips comprises a lower heat and drive section 21, a central conveyor section 22, and an upper heating, storing and dispensing section 23. The lower section 21 includes facilities for supplying heat to the device and for driving the conveyor system of the section 22. The conveyor section 22 continuously heats soft tortillas. The upper section 23 is used to heat, store and dispense the toasted tortilla chips utilizing the same heat source as functions with the conveyor section. The soft tortilla products are fed into the conveyor section at the right end of the device as seen in FIG. 1, propelled through and heated in the device, and discharged at the left end of the device as illustrated. The toasted tortilla chips are supplied to the device through the top of the upper section 23 in which they are heated and stored and the chips are then dispensed through the side chutes as seen in FIGS. 1 and 2 along the front of the device as illustrated.

The lower heating and power section of the food processing device 20 has four vertical legs 24 situated at the four corners of the rectangular section and extending the full height of the section to provide a framework on which are secured a removable front panel 25, a right end panel 30, a left end panel 31, and a back panel 32. A drive motor 33 is secured on the left end of the power section within a housing 34 connected with the end panel 31. The motor has a shaft 35 supporting a gear 40 which drives a chain 41 for powering the conveyor system in the section 22. Electrical power cord 42 is connected between the motor and a speed control unit 43 mounted on the left end panel 31 for adjusting the speed of operation of the motor 33. The electrical power is connected through an off-on switch 44 mounted at the right end of the device along the bottom edge of the conveyor section 22.

The food processing device 20 is supplied with heat in the lower section 21 by spaced tubular gas burners 50, FIG. 8, secured horizontally in spaced relation between the front and back panels of the lower section. Each of the tubular gas burners is a conventional unit having a control rod 51 extending out from the front of the unit through a set of upper perforations 52 in the removable front panel 25. The panel 25 has middle and lower rows of perforations 53 which admit air into the interior of the lower section 21 of the unit for combustion purposes.

The left end of the device 20 is provided with a soft tortilla discharge shelf 60 mounted between parallel spaced vertical ends 61 and 62. The shelf 60 is for supporting a bowl, pan, or other container to receive heated soft tortillas from the discharge end of the conveyor section 22. The shelf 60 and end panel 61 and 62 are connected with a back panel 63. The ends 61 and 62 of the shelf are suitable secured with the end panel 31.

The middle conveyor section 22 houses and supports an upper conveyor belt 70 and a lower belt 71 which extend horizontally between a front panel 72 and a back panel 73. As evident in FIGS. 1-4, the bottom section 21 and the top section 22 have upper and lower flanges respectively to facilitate securing the two sections together. The conveyor section is closed at opposite ends by a left end panel 74 and a right end panel 75. Referring particularly to FIG. 8, the upper conveyor belt 70 includes a plurality of flat parallel bars 80 secured on spaced transverse chains 81 which run on end gears 82 supported on shafts 83 mounted in parallel relation at opposite ends of the conveyor section. The shafts 83 are mounted at opposite ends in bearing units 84 which are secured with the front and back panels of the conveyor section for supporting the conveyor belt gear shafts. The lower conveyor belt 71 is similarly made up of a plurality of transverse parallel flat bars 80 mounted on a pair of longitudinal transversely spaced continuous chains 90 which run between end gears 91 mounted on shafts 92. The shafts 92 are mounted at opposite ends in pillow block bearings 93 mounted on the front and back panels of the conveyor section. The upper portion of the lower belt is supported on a frame made up of a pair of longitudinally spaced parallel bars 94 which support horizontal longitudinally extending and transversely spaced parallel skid strips 95 along which the inside faces of the bars 80 on the upper section of the lower belt slide as the belt is driven. The lower section of the upper belt and the upper section of the lower belt must run in very closely spaced relation so that the soft tortillas are confined between the outer surfaces of the belt bars as they are heated and held flat. The skid supports 95 are necessary to hold the upper section of the belt flat or otherwise it would sag due to its own weight. No such arrangement is necessary, however, for the lower section of the upper belt because the weight of the belt causes it to sag into the essential contact with the upper face of the lower belt. As seen in FIG. 9, the right end of the lower conveyor belt 71 is partially enclosed by a housing 100 so that only the portion of the upper face of the belt moving into the conveyor section is exposed for placing soft tortillas to be heated on the belt.

Figure 4:
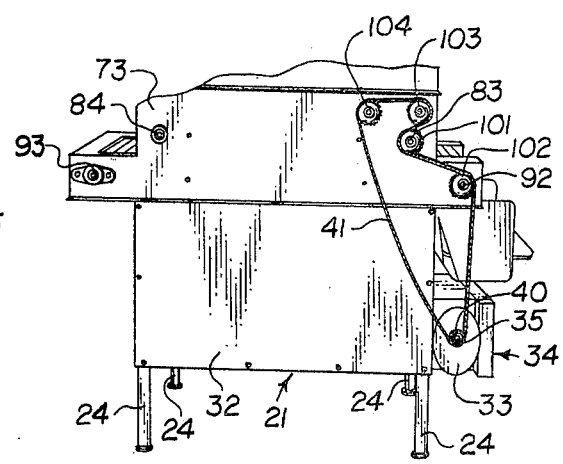
FIG. 4 is a fragmentary back view in perspective showing the drive chain cover removed to expose the conveyor drive system of the device.

The drive system for the conveyor belts is illustrated in FIG. 4 which shows a drive gear 101 mounted on the back end of the left end shaft 83 of the upper conveyor belt. A drive gear 102 is similarly mounted on the back end portion of the left end shaft 92 of the lower conveyor belt. A pair of spaced idler gears 103 and 104 are mounted on the back panel 73 above the gear 101 on the upper conveyor belt. The drive chain 41 is reaved over the conveyor belt drive gears and the idler drive gears from the motor 33. The chain 41 is reaved in appropriate direction around the drive gears for the conveyor belts and the idler gears so that, as viewed in FIG. 4, the drive gear 102 for the input end of the lower conveyor belt is driven counterclockwise while the chain runs under the drive gear 101 for the corresponding end of the upper belt and around the gear on the left side to drive the upper conveyor belt in such a direction that the upper portion of the lower conveyor belt and the lower portion of the upper conveyor belt are moving in the same directions. Thus, a soft tortilla may be captured between the top face of the lower belt and the bottom face of the upper belt and transported through the device to the left discharge end as viewed in FIGS. 1 and 2. After complete assembly of the device a cover 105 is secured with the back panels 32 and 73 respectively of the lower and middle sections of the device to cover the drive motor 33, the drive chain 41, and the various drive gears and idler gears powering the conveyor system.

The plates 80 of the conveyor belts must be able to withstand the temperatures necessary to properly heat the soft tortillas and since food products are being processed the plate surfaces must be finished so that the tortillas will not stick to them and so that they may be kept clean and sanitary. Thus, the plates 80 may appropriately be made of stainless steel and may be coated with available plastic materials which are used in cooking utensils and other food processing equipment currently available.

The upper heating, storage and dispensing section 23 of the device 20 is formed by front panels 110 and 111, a left end panel 112, a right end panel 113, and a back panel 114. These several final panels are flanged along lower edges as evident in FIGS. 1-4 for connection with corresponding flanges on the upper edges of the panels forming the conveyor section. The top section is covered by a hinged top 115 secured with the back panel 114 by a suitable hinge 120. A lever 121 connected with the left end of the top 115 is used to open and close the top. As seen in FIG. 5, the upper compartment section 23 is provided with an internal floor 122 which slopes toward the front of the device secured between the front and back panels and the end panels providing a full length and width sloping floor which tends to cause the tortilla chips supported on the floor within the compartment to tend to flow forward in the upper compartment. A pair of chute and tray support assemblies 130 are secured in spaced relation on the front of the device as best seen in FIGS. 1 and 2. The chute assemblies are made in upper and lower sections secured respectively to the panel 111 in the upper section 23 and the panel 72 in the middle section 22 of the device. Each of the chute assemblies is identical and thus, for brevity the respective parts of each will be given the same numbers and only one of the chute assemblies will be described. The lower portion of each chute assembly has side panels 131 and a bottom panel 132 extending horizontally between the side panels. The bottom panel 32 has spaced holes 133 the function of which will be described later. The upper portions of the chutes are defined by side panels 134 which have downwardly and forwardly sloping top edges 135 providing stops for a door 140 hinged along an upper end edge at 141 with the panel 111. A rectangular opening 142, see FIG. 5, is defined between the chute sides 134 extending the full height of the chutes opening into the interior of the upper compartment section 23 so that heated chips on the floor 122 within the compartment may flow out through the opening behind the door 140 between the sides 134. As evident in FIG. 5 the flanged lower edge of the panel 111 extends across defining the bottom of the opening 142 into the heating and storage compartment. Similarly, the upper edge of the panel 72 is flanged and below the upper edge flange on the panel 72 a rectangular opening 143 is provided running horizontally between the inside faces of the chute lower side panels 131 communicating into the conveyor portion of the device. An internal damper or door 144 is provided secured by a hinge 145 on the inside face of the panel 72 behind each of the openings 143. A control lever 150 is secured with the bottom edge of the front face of the damper door 144. The control lever 150 is an upwardly bent arc shape extending forwardly through a vertical slot 151 as seen in FIG. 1 in the front panel 72 outside of the chute lower side panel 131 so that the damper door 144 may be closed and adjusted to various open positions from the front of the device between the two chute assemblies. The damper door 144 and the opening 143 permit heat in the conveyor section of the device to flow upwardly between the side wall panels of the chute assemblies back into the upper compartment through the openings 142 of each of the chute assemblies. The chute assemblies each supports a basket tray 160 which is shown secured in place in FIGS. 1, 2, 3, and 5 and is shown independently in FIGS. 6 and 7. Each of the basket tray assemblies has vertical side walls 161, a front sloping wall 162 and an intermediate vertical wall 163. Basket support rods 164 are secured in parallel spaced relation extending horizontally between the walls 162 and 163 for supporting a serving basket, not shown, in which the heated tortilla chips are placed from the upper compartment through the chute assembly for serving. A short horizontal partial panel 165 having an arcuate forward opening 170 is secured between the side walls 161 extending forwardly from the intermediate wall 163. The opening 170 is to properly position or guide a basket resting on the support rods 164 within the tray assembly when filling a basket with heated chips. The bottom of the tray assembly is open between the side walls 161 and the forward and intermediate walls 162 and 163. An inside end section of the tray 160 has a bottom panel 171 and a perforated top panel 172 which is removably supported on narrow flanged tracks 173 secured along the top edge of each of the side panels 161 inwardly of the vertical panel 163. The perforated panel 172 is removable for cleaning purposes as it supports the heated chips on the upper face of the panel and permits the flow of heated gasses from below the floor 122 upwardly into the compartment 23 above the floor. The bottom 171 has a pair of spaced pins 174 which fit in the holes 133 in the bottoms 132 on each of the chute assembly lower housings. With the tray assemblies 160 fitted into the chute assemblies the pins 174 lock in the openings 133 of the bottoms 132 while the upper forward edges 175 on either side of the inside ends of the tray assemblies slide under and lock beneath the upper edge flange across the front panel 72 just above the openings 143 in each of the chute assemblies. With the tray assemblies in place heat flows upwardly from around the conveyor belts past the open door 144 through the opening 143 into the inward end portion of the tray assembly defined above the bottom 171 inwardly of the panel 163 below the perforated top panel 172. The hot gasses flow upwardly through the perforated panel 172 between the walls 134 back into the upper compartment through the openings 142 above the floor 122.

Both the conveyor section 22 and the upper compartment section 23 are vented to the atmosphere by a flue 180 which has a vertical section 181, a lower horizontal section 182 opening through the back panel 114 below the floor 122 and an upper horizontal section 183 opening into the upper portion of the upper compartment. Each of the horizontal flue sections has a damper 184 for selectively controlling the flow of hot gasses through the portion of the flue in which the damper is mounted. A thermometer 190 is secured on the front of the device through the panel 72 to monitor the temperature within the conveyor section. Magnets 200 are provided for holding the doors 140 open and when the doors are lifted by the handles 140a.

The food processing device 20 is used to provide a substantial quantity of toasted tortilla chips which are heated, stored and dispensed from the upper compartment section 23 and to provide a continuous supply as needed of heated soft tortillas utilizing the conveyor section 22. In order to provide heat to both the conveyor section and the upper compartment section, the gas burners 50 are lighted and controlled to the desired level by means of the control handles 51. The gas burners are in the open space within the lower section 21 of the device below the conveyor belts. It will be recognized that since the entire device below the sloping floor 122 is open within the side and end panels of both the bottom section 21 and the middle conveyor section 22, the heat from the burners 50 heats the entire space around the conveyor belts. The damper 184 in the lower flue section 182 is opened to vent the device below the floor 122 to the atmosphere. If the heating of tortilla chips in the upper compartment 23 is desired, the tray assemblies 160 are installed in the device as shown in FIG. 5 and the doors 144 are opened by the adjusting levers 150. The gasses heating the conveyor section then flow upwardly as previously described through the chute assemblies passing into the assemblies through the openings 143 and upwardly through the perforated plates 172 and back inwardly into the upper compartment section 23 through the openings 142. The damper 184 is opened in the upper flue section 183 to vent the upper compartment to the atmosphere. Tortilla chips which are to be heated in the upper compartment are poured into the compartment by raising the top 115 by means of the lever 121 pivoting the top upwardly on the hinge 120 shown in FIG. 5. The tortilla chips rest on the sloping floor 122 generally flowing forwardly into the portion of the chute assemblies above the perforated plates 172 within the doors 140. Thus the path of the hot gasses from below the floor 122 pass entirely through all of the chips being stored above the floor. When chips are desired a basket is placed in either or both of the tray assemblies on the rods 164, the door 140 adjacent to the basket is raised and person desiring to serve the chips pulls the chips through the chute assembly into the basket.

When heated soft tortillas are desired the conveyor belts are turned on by operating the switch 44 and the speed of the belts may be adjusted by the control 43. The motor 33 drives the gear 40 on its shaft 35 in a direction to power the chain 41 for driving the chain over the conveyor belt drive gears 101 and 102 and the idler gears 103 and 104. The gear 102 is turned in a clockwise direction while the gear 101 is turned counterclockwise to drive the upper section of the lower belt and the lower section of the upper belt toward the right as viewed in FIG. 4 which would be toward the left as seen in FIGS. 1 and 2. The soft tortillas to be heated are placed flat on the exposed input end of the lower belt at the right end of the device as seen in FIG. 1 and FIG. 9 so that the belt carries the tortillas into the heated conveyor section capturing the tortillas between the adjacent upper and lower belt sections as viewed in FIG. 8. As the soft tortillas are transported between the belts through the device they are heated and maintained flat. A basket or other receptable, not shown, is placed on the shelf 60 at the discharge end of the conveyor belts so that after the soft tortillas are heated they are discharged from the device on the surface of the lower belt dropping from the lower belt surface into the basket resting on the shelf 60. The conveyor system may be so operated so long as warm soft tortillas are desired with the tortillas being fed into the unit as fast as the belts will accommodate them.

Referring to FIG. 8A and 9A, a modified food processing device 20A embodying the features of the invention includes a lower conveyor belt 71A and a heat reflective panel 200 in place of the upper conveyor belt. The conveyor belt 71A is identical to the belt 70 of the device 20 as previously described. The reflective panel 200 is secured across the upper portion of the housing by horizontal rods 201 which are connected at opposite ends to the side panels 72 and 73 by nuts 201A threaded through the side panels into the ends of the rods. The panel 200 is suitably secured as by spot welding to the upper face of the panel. The panel 200 is parallel to and spaced above the upper portion of the belt 71A to allow passage of the tortillas on the belt. A suitable spacing may be about 0.75 inches. The panel 200 reflects heat back to the tortillas on the belt as they move from the inlet to the discharge of the device. The panel 200 is of about the same horizontal dimensions as the upper belt 70 thus allowing ample space along the panel sides and ends for upward flow of hot gases to the space below the floor 122 and into the upper section 23 to heat toasted tortilla chips.

Otherwise, the modified device 20A operates in the same manner as the device 20 as already described.

It will now be understood that the food processing device of the invention provides apparatus for heating both toasted tortilla chips and soft tortillas from a common heat source. That a substantial volume of chips may be stored in the device for an available supply of heated chips. Similarly, the soft tortillas may be fed continuously through the device as needed for serving. The compartmentized arrangement of the device makes it relatively simple to disassemble the device for cleaning purposes. The lower belt is always exposed by operating the conveyor system for cleaning while the upper belt may be readily exposed by lifting the upper compartment section 23 from the middle conveyor section.

I claim:

1. A food processing device for heating soft tortillas and for heating, storing, and dispensing toasted tortilla chips comprising: a heating means a bottom heating section including housing means defining a bottom heating compartment enclosed around the sides and ends thereof and open at the bottom and top; means secured with said housing defining said bottom compartment for heating the space within said bottom compartment; a middle section connected with said bottom secton defining a middle compartment open at the bottom and top thereof and communicating with said heating means in said bottom section for heating said middle compartment; a conveyor system in said middle section including an upper conveyor belt and a lower conveyor belt, said upper conveyor belt having a lower portion thereof and said lower conveyor belt having an upper portion thereof moving in closely spaced parallel relationship for capturing and transporting through said middle compartment soft tortillas for heating such tortillas and holding said tortillas in substantially flat condition, said upper conveyor belt being shorter than said lower conveyor belt, said upper portion of said lower conveyor belt extending from opposite ends of said middle section providing an input end and a discharge end for said soft tortillas; shelf means secured at said discharge end of said lower conveyor belt below said end of said belt for supporting a container to receive and hold heated soft tortillas discharged from said discharge end of said lower conveyor belt; drive means connected with said upper and lower conveyor belts for driving said belts at substantially equal speeds, an upper housing section secured with said middle housing section in defining an upper compartment for storing, heating and dispensing said toasted tortilla chips, said upper housing section having ends and sides corresponding with ends and sides of said middle housing section; a movable top secured on said upper housing section for movement between an open condition for filling said upper compartment with said tortilla chips and a closed condition for confining heat in said upper compartment; a floor in said upper housing section separating said upper compartment from said middle compartment; dispensing chute means connected with said middle and upper housing sections, said dispensing chute means defining a passage for hot gasses between said middle compartment and said upper compartment around said floor including a first opening from said chute means and said middle compartment and a second opening spaced upwardly from said first opening from said chute means into said upper compartment and including a door means into said chute means for access into said upper compartment through said upper opening from said chute means into said upper compartment for dispensing said tortilla chips from said upper compartment; and flue means connected into said upper section above and below said floor for venting said middle compartment and said upper compartment to the atmosphere.

2. A food processing device in accordance with claim 1 including removable tray means connected with said chute means for supporting a container adjacent to said door of said chute means to hold said container while toasted tortilla chips are dispensed through said door into said container; and damper door means within said middle housing section operable over said lower opening between said chute means and said middle compartment for controlling communication of heated gasses from said middle compartment upwardly through said chute means into said upper compartment.

3. A food processing device in accordance with claim 2 including a support frame secured with said middle housing section within said bottom conveyor belt for holding and supporting said upper section of said bottom conveyor belt in a substantially flat relationship closely spaced from said lower section of said upper conveyor belt.

4. A food processing device for heating soft tortillas and for heating, storing, and dispensing toasted tortilla chips comprising: a heating means a bottom heating section including housing means defining a bottom heating compartment enclosed around the sides and ends thereof and open at the bottom and top; means secured with said housing means defining said bottom compartment for heating the space within said bottom compartments; a middle section connected with said bottom section defining a middle compartment having an input end and an output end and being open at the bottom and top thereof and communicating with said heating means in said bottom section for heating said middle compartment, a conveyor system in said middle compartment including a conveyor belt extending from said input end to said output end of said middle compartment for transporting soft tortillas through said middle compartment from said input end to said output end; shelf means secured at said output end of said middle compartment below the end of said belt at said output end for supporting a container to receive and hold heated soft tortillas discharged from said end of said conveyor belt; drive means connected with said conveyor belt for driving said belt to transport said soft tortillas through said device; a heat reflective panel secured in said middle compartment parallel with and spaced above the upper portion of said conveyor belt moving through said middle compartment, said reflective panel having side and end edges spaced from the inside walls of said middle section to permit upward gas flow around said panel in said middle compartment; an upper housing section secured with said middle housing section defining an upper compartment for storing, heating and dispensing said toasted tortilla chips, said upper housing section having ends and sides corresponding with the ends and sides of said middle housing section; a movable top secured on said upper housing section adapted to open for filling said upper compartment with said tortilla chips and to close for confining heat in said upper compartment; a floor in said upper housing compartment separating said upper compartment from said middle compartment; dispensing chute means connected with said middle and upper housing sections, said dispensing chute means defining a passage for hot gasses between said middle compartment and said upper compartment around said floor including a first opening from said chute means and said middle compartment and a second opening spaced upwardly from said first opening from said chute means into said upper compartment and including door means into said chute means for access into said upper compartment through said upper opening from said chute means into said upper compartment for dispensing said tortilla chips from said upper compartment; and flue means connected into said upper section above and below said floor for venting said middle compartment and said upper compartment to the atmosphere.

5. A food processing device in accordance with claim 4 wherein said conveyor belt comprises two transversely spaced longitudinal chains and transverse plates secured on said chains defining a supporting surface for transporting said soft tortillas through said device.

6. A food processing device in accordance with claim 5 including removable tray means connected with said chute means for supporting a container adjacent to said door of said chute means to hold said container while toasted tortilla chips are dispensed through said door into said container; and damper door means within said middle housing section operable over said lower opening between said chute means and said middle compartment for controlling communication of heated gases from said middle compartment upwardly through said chute means into said upper compartment.

7. A food processing device in accordance with claim 6 including a support frame secured with said middle housing section within said conveyor belt for holding and supporting said upper portion of said conveyor belt in a substantially flat relationship closely spaced from said reflective panel.

* * * * *